United States Patent
Soejima et al.

(10) Patent No.: US 8,725,382 B2
(45) Date of Patent: May 13, 2014

(54) VEHICLE CONTROL APPARATUS THAT INHIBITS FUEL EFFICIENCY FROM BEING AGGRAVATED AS A RESULT OF RETARDING IGNITION TIMING

(75) Inventors: Shinichi Soejima, Gotenba (JP); Naoto Kato, Susono (JP); Kiyonori Takahashi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 573 days.

(21) Appl. No.: 12/672,376

(22) PCT Filed: Jan. 26, 2009

(86) PCT No.: PCT/JP2009/051156
§ 371 (c)(1),
(2), (4) Date: Feb. 5, 2010

(87) PCT Pub. No.: WO2010/084611
PCT Pub. Date: Jul. 29, 2010

(65) Prior Publication Data
US 2011/0082629 A1    Apr. 7, 2011

(51) Int. Cl.
G05D 17/00    (2006.01)
(52) U.S. Cl.
USPC .......................................................... 701/84
(58) Field of Classification Search
USPC ................................ 701/54, 84, 90, 99, 101
See application file for complete search history.

(56) References Cited

U.S. PATENT DOCUMENTS

| 5,305,662 | A | * | 4/1994 | Togai et al. | 477/43 |
| 5,625,558 | A | * | 4/1997 | Togai et al. | 701/93 |
| 6,006,717 | A | * | 12/1999 | Suzuki et al. | 123/295 |
| 6,325,046 | B1 | * | 12/2001 | Kanno | 123/406.44 |
| 6,678,605 | B2 | * | 1/2004 | Kisaka et al. | 701/111 |
| 6,757,603 | B2 | * | 6/2004 | Nozaki | 701/51 |

(Continued)

FOREIGN PATENT DOCUMENTS

| JP | A-2005-113877 | 4/2005 |
| JP | A-2006-63959 | 3/2006 |

(Continued)

OTHER PUBLICATIONS

International Search Report issued in International Application No. PCT/JP2009/051156 on Feb. 24, 2009 (with translation).

(Continued)

*Primary Examiner* — Thomas Black
*Assistant Examiner* — Sze-Hon Kong
(74) *Attorney, Agent, or Firm* — Oliff PLC

(57) ABSTRACT

A vehicle control apparatus that inhibits fuel efficiency from being aggravated as a result of ignition timing of the internal combustion engine being retarded. The vehicle control apparatus includes a drive system control unit and an engine control unit. The engine control unit adjusts an amount of intake air based on the demanded torque and adjusts ignition timing so as to compensate for any deviation between torque achievable through an adjustment of the amount of intake air and the demanded torque. The drive system control unit calculates desirable torque to be desirably output to the internal combustion engine for achieving a target operating state of the vehicle, and limits a change rate of the desirable torque by using a predetermined guard value determined from torque adjustment capacity of the internal combustion engine and outputs the desirable torque after the limiting as the demanded torque to the engine control unit.

4 Claims, 2 Drawing Sheets

(56) References Cited

U.S. PATENT DOCUMENTS

| | | | |
|---|---|---|---|
| 7,331,317 B2* | 2/2008 | Yasui et al. | 123/90.15 |
| 7,487,033 B2* | 2/2009 | Hijikata | 701/113 |
| 7,571,712 B2* | 8/2009 | Kuroda et al. | 123/434 |
| 7,647,766 B2* | 1/2010 | Surnilla et al. | 60/285 |
| 7,869,931 B2* | 1/2011 | Satou et al. | 701/111 |
| 7,966,989 B2* | 6/2011 | Kurashima et al. | 123/297 |
| 8,108,108 B2* | 1/2012 | Field et al. | 701/50 |
| 8,112,192 B2* | 2/2012 | Heap et al. | 701/22 |
| 8,473,133 B2* | 6/2013 | Wang et al. | 701/22 |
| 8,635,001 B2* | 1/2014 | Doering et al. | 701/84 |
| 2005/0065691 A1* | 3/2005 | Cho | 701/54 |
| 2007/0106451 A1* | 5/2007 | Kuroda et al. | 701/103 |
| 2007/0254772 A1 | 11/2007 | Satou et al. | |
| 2007/0266711 A1* | 11/2007 | Falkenstein et al. | 60/702 |
| 2008/0066715 A1* | 3/2008 | Jankovic | 123/302 |
| 2008/0300768 A1* | 12/2008 | Hijikata | 701/102 |
| 2009/0118971 A1* | 5/2009 | Heap et al. | 701/102 |

FOREIGN PATENT DOCUMENTS

| | | |
|---|---|---|
| JP | A-2007-292031 | 11/2007 |
| JP | A-2008-151054 | 7/2008 |
| JP | A-2008-280926 | 11/2008 |
| JP | A-2010-019136 | 1/2010 |

OTHER PUBLICATIONS

Aug. 9, 2011 International Preliminary Report on Patentability issued in International Application No. PCT/JP2009/051156.

* cited by examiner

VEHICLE CONTROL APPARATUS THAT INHIBITS FUEL EFFICIENCY FROM BEING AGGRAVATED AS A RESULT OF RETARDING IGNITION TIMING

TECHNICAL FIELD

The present invention relates to a vehicle control apparatus controlling a vehicle operating state by using a torque generated by an internal combustion engine.

BACKGROUND ART

In a known spark-ignition type internal combustion engine, an adjustment of ignition timing is used together with an adjustment of an amount of air as means for controlling torque thereof. In the art disclosed in JP-A-2005-113877, for example, a demanded torque is corrected by ignition timing efficiency determined according to a difference between base ignition timing and an MBT and, based on the efficiency-corrected demanded torque, a demanded throttle opening degree is calculated. In addition, an estimated torque is obtained in the MBT estimated from an actual amount of air and an engine speed and an ignition retard amount is calculated relative to the MBT based on a ratio between the estimated torque and the demanded torque before the correction.

According to the art disclosed in the above publication, the throttle opening degree changes according to a change in the demanded torque and the amount of air changes according to the change in the throttle opening degree. The estimated torque then changes according to the change in the amount of air. Specifically, the estimated torque changes, following the demanded torque. Various types of response lags such as, for example, a lag in arithmetic operations performed by a control system, and signal transmission carried out within a control system, a lag in a throttle operation, or a lag in a sensor output are produced during a process in which the demanded torque is reflected in the estimated torque. There is, as a result, a time deviation at all times between the estimated torque and the demanded torque.

The abovementioned time deviation poses a problem when the demanded torque is changing transiently, or particularly when the demanded torque is decreasing. For example, when the demanded torque is changing vibratingly, the estimated torque follows the demanded torque to change vibratingly. The abovementioned various types of response lags appear, at this time, as a phase shift between the estimated torque and the demanded torque. This results in periodically occurring a period of time during which the estimated torque is greater than the demanded torque.

According to the art disclosed in the above publication, the ignition retard amount is determined according to the ratio between the estimated torque and the demanded torque, so that the ignition timing is retarded more than the MBT during the period in which the estimated torque is greater than the demanded torque. Such ignition retarding is automatically performed even when the ignition timing efficiency is set to the maximum efficiency, that is, when the operation in the MBT is demanded. Specifically, the art disclosed in the above publication involves possible unnecessary aggravation of fuel efficiency as a result of unintentional retarding of the ignition timing.

Relating to the above problem, the applicant proposed an invention that served as a solution thereto in Japanese Patent Application No. 2008-178963. According to the invention of this application, when a change rate in the demanded torque can be achieved through a throttle operation, the torque efficiency that serves as the basis for setting the ignition timing is fixed to 1 as the maximum efficiency. Should the estimated torque become greater than the demanded torque as a result of the time deviation between the estimated torque and the demanded torque, therefore, unnecessary ignition retarding can be prevented because of the torque efficiency fixed to the maximum efficiency.

If, however, the demanded torque itself changes at a rate that cannot be achieved by the throttle operation only, the ignition retarding is activated. Assume, for example, a case in which a periodically increasing or decreasing component is added to the demanded torque for the purpose of, for example, inhibiting vehicle pitching. Fuel efficiency is aggravated, though the change rate in the demanded torque can be achieved thanks to the activation of the ignition retarding. Fuel efficiency is particularly important among other performance requirements of a vehicle. To give improved fuel efficiency the top priority, retarding of the ignition timing should be inhibited as much as feasible.

Disclosure of the Invention

The present invention has been made to solve the above-described problem and it is an object of the present invention to provide a control apparatus for a vehicle that can inhibit fuel efficiency from being aggravated as a result of ignition timing of an internal combustion engine being retarded.

A control apparatus for a vehicle according to the present invention includes a drive system control unit and an engine control unit. The drive system control unit is on a higher level of hierarchy of a control system relative to the engine control unit, comprehensively controlling the drive system of the vehicle. The engine control unit controls an internal combustion engine based on demanded torque issued from the drive system control unit. The internal combustion engine is a power drive system of the vehicle and the drive system control unit controls an operating state of the vehicle by using torque generated by the internal combustion engine.

Specifically, the engine control unit adjusts an amount of intake air based on the demanded torque and adjusts ignition timing so as to compensate for any deviation between torque that is achievable through an adjustment of the amount of intake air and the demanded torque. The drive system control unit calculates torque to be desirably outputted to the internal combustion engine for achieving a target operating state of the vehicle and uses that desirable torque as the demanded torque to be outputted to the engine control unit. The desirable torque is calculated based on an accelerator operation amount by a driver or signals from various types of sensors mounted on the vehicle. The drive system control unit limits a rate of change of the desirable torque calculated as described above using a predetermined guard value determined from torque adjustment capacity of the internal combustion engine and calculates the desirable torque after the limiting as the demanded torque. The guard value is set with reference to a range of the change rate of torque achievable through the adjustment of the amount of intake air in the internal combustion engine.

According to the control apparatus of the present invention, a range of the rate of change of torque to be achieved through the adjustment of the amount of intake air is considered at a stage of generating the demanded torque by the drive system control unit. The smaller the demanded torque is than the torque achievable through the adjustment of the amount of intake air, the more the ignition timing is retarded by the engine control unit; however, the above-referenced range being, taken into consideration in the demanded torque in advance helps prevent the ignition timing from being retarded or keep the ignition timing within a permissible range, so that fuel efficiency can be inhibited from being aggravated as a result of retarding of the ignition timing.

In a more preferable aspect of the present invention, the guard value is a limit value of the range of the change rate of torque achievable through the adjustment of the amount of intake air in the internal combustion engine. Such a setting allows the demanded torque to be achieved only through the adjustment of the amount of intake air, which helps prevent reliably the retarding of the ignition timing involving aggravation of the fuel efficiency.

In an even more preferable aspect of the present invention, the guard value is calculated in the engine control unit based on a current or target operating state of the internal combustion engine and outputted from the engine control unit to the drive system control unit. The arrangement in which the engine control unit that directly controls the internal combustion engine calculates the guard value allows the range of the change rate of the torque achievable through the adjustment of the amount of intake air to be even more accurately reflected in the guard value.

In an even more preferable aspect of the present invention, the drive system control unit enables or prohibits limiting of the desirable torque by the guard value according to the target operating state of the vehicle. When, for example, the operating state gives precedence to fuel efficiency, the limiting of the desirable torque by the guard value is enabled. When, on the other hand, the operating state gives precedence to torque accuracy over the fuel efficiency, the limiting of the desirable torque by the guard value is prohibited.

DESCRIPTION OF REFERENCE NUMERALS

2: vehicle control apparatus
4: drive system control unit
6: engine control unit
10: gradient guard

BEST MODES FOR CARRYING OUT THE INVENTION

An embodiment of the present invention will be described below with reference to each of FIGS. 1 to 3.

Figure 1:
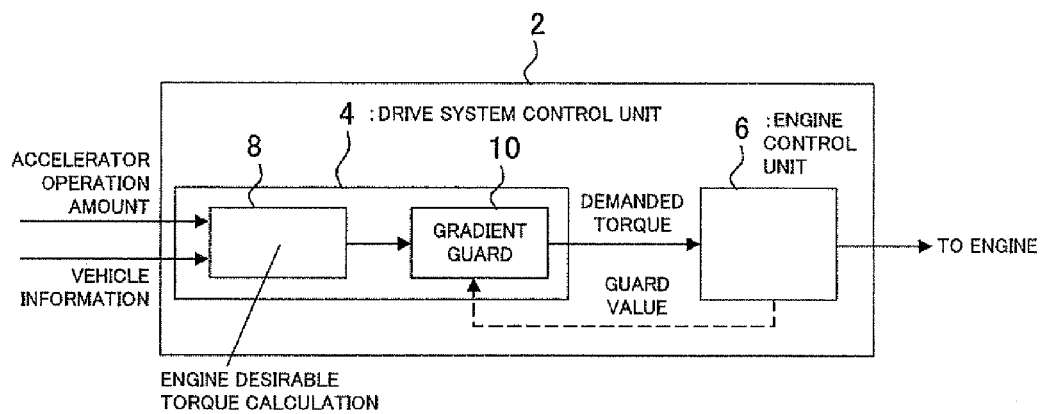
FIG. 1 is a block diagram showing an arrangement of a vehicle control apparatus as an embodiment of the present invention.

FIG. 1 is a block diagram showing an arrangement of a vehicle control apparatus as an embodiment of the present invention. A vehicle control apparatus 2 according to the embodiment of the present invention includes two parts of a higher or lower level of hierarchy relative to each other in a control system. A drive system control unit 4 is on the higher level of hierarchy, while an engine control unit 6 that controls an engine (internal combustion engine) is on the lower level of hierarchy. In addition to these, the vehicle control apparatus 2 also includes, for example, a transmission control unit controlling an automatic transmission which are not, however, shown or described, because they are not related to the embodiment of the present invention.

The vehicle control apparatus 2 uses the drive system control unit 4 to perform a comprehensive control of a vehicle drive system. The drive system control unit 4 lets the engine generate desired torque via the engine control unit 6 and controls a vehicle operating state by using torque outputted by the engine. In addition to an accelerator operation amount of a driver, signals (vehicle information) from various types of sensors mounted on the vehicle (for example, a wheel speed sensor, a yaw rate sensor, and an acceleration sensor) are inputted to the drive system control unit 4. The drive system control unit 4 calculates not only torque demanded by the driver of the vehicle based on the accelerator operation amount, but also various types of torque (for example, stability control torque, traction control torque, gearshift shock prevention torque, and pitching inhibition torque) demanded for vehicle control based on the vehicle information obtained from the sensors. These types of torque are mediated with each other to obtain desirable torque which is to be outputted by the engine. An arithmetic section 8 conducts the mediation to calculate the desirable torque. The mediation as the term is herein used means an operation to obtain a single numeric value from a plurality of numeric values in accordance with a predetermined calculation rule. The calculation rule includes, for example, selecting a maximum value, selecting a minimum value, averaging, or summing. A plurality of these calculation rules may be appropriately combined together.

The drive system control unit 4 includes a gradient guard 10, in addition to the abovementioned arithmetic section 8. The gradient guard 10 is means for applying a guard to a gradient of the desirable torque, specifically, a rate of change. The drive system control unit 4 does not demand the desirable torque calculated by the arithmetic section 8 directly from the engine, but outputs what is processed by the gradient guard 10 as demanded torque. Having such a gradient guard 10 is one of the important features of the vehicle control apparatus 2. Details of the gradient guard 10 will be described later.

The engine control unit 6 controls the engine based on the demanded torque supplied from the drive system control unit 4. In the vehicle to which the present invention is applied, the engine means a spark-ignition type engine that can control torque with the amount of intake air and the ignition timing. The engine according to this embodiment includes a throttle that serves as an actuator for adjusting the amount of intake air and an ignition device that serves as an actuator for adjusting the ignition timing. The engine control unit 6 operates these actuators to control torque generated by the engine.

Figure 2:
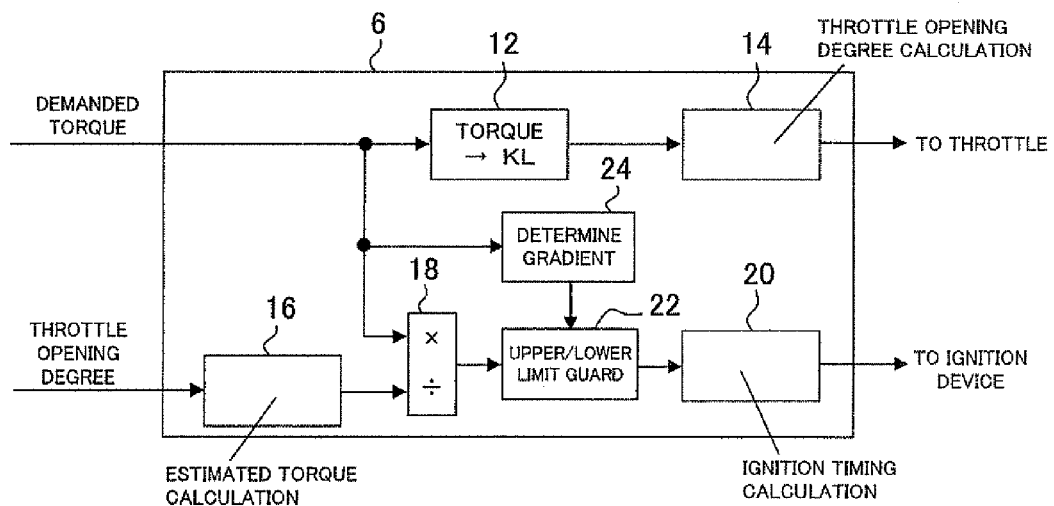
FIG. 2 is a block diagram showing an arrangement of an engine control unit of the vehicle control apparatus according to the embodiment of the present invention.

FIG. 2 is a block diagram showing an arrangement of the engine control unit 6. The engine control unit 6 first uses an arithmetic section 12 included therein to convert the obtained demanded torque to a corresponding amount of air (KL). The amount of air obtained through this conversion process is to be a target amount of air of the engine. The amount of air as the term is herein used means an amount of cylinder intake air per cycle that may be nondimensionalized and replaced by a charging efficiency (load factor). A map that relates torque with the amount of air is used for the conversion process. The map uses keys that represent various types of operating conditions affecting the relationship between the torque and the amount of air, such as, for example, an engine speed and an air-fuel ratio. Note that the ignition timing is assumed to be MBT.

The engine control unit 6 next uses an arithmetic section 14 included therein to calculate a throttle opening degree from the target amount of air. A reverse model of an air model is used for calculation of the throttle opening degree. The air model is a physics model of an intake system, for modeling response of the amount of air relative to throttle operations based on, for example, fluid dynamics. The engine control unit 6 sets the throttle opening degree converted from the target amount of air as a throttle operation amount and operates the throttle according to the set throttle opening degree.

Additionally, the engine control unit 6 calculates a ratio of the demanded torque to an estimated torque of the engine (hereinafter referred to as torque efficiency) and calculates the ignition timing based on the torque efficiency. The torque efficiency is calculated by an arithmetic section 18. The estimated torque as the term is herein used means torque to be obtained when the ignition timing is set to the MBT in the current throttle opening degree, specifically, maximum torque achievable in the current amount of intake air. In calculating the estimated torque, first the abovementioned air model is used to calculate the amount of air estimated to be achievable with the current throttle opening degree. Then, the map that relates torque with the amount of air in the MBT is used to convert the estimated amount of air to corresponding torque. The torque thus obtained is the estimated torque. These calculations are performed by an arithmetic section 16 included in the engine control unit 6.

The engine control unit 6 includes an upper/lower limit guard 22. The upper/lower limit guard 22 is means for applying guard to the magnitude (lowness) of the torque efficiency. Instead of using the torque efficiency calculated by the arithmetic section 18 directly for calculating the ignition timing, the engine control unit 6 calculates the ignition timing based on what is processed by the upper/lower limit guard 22. The upper/lower limit guard 22 is operated by a signal from a gradient determination section 24 included in the engine control unit 6. The upper/lower limit guard 22 and the gradient determination section 24 will be described in detail later.

The engine control unit 6 uses an arithmetic section 20 included therein to convert the torque efficiency to corresponding ignition timing. The ignition timing obtained through this conversion process serves as an operation amount of the ignition device. A map that relates the torque efficiency with the ignition timing is used for the conversion process. The map uses keys that represent various types of operating conditions affecting the relationship between the torque efficiency and the ignition timing, such as, for example, the demanded torque, the engine speed, and the air-fuel ratio. According to this map, the ignition timing is set to the MBT when the torque efficiency is the maximum value of 1 and to a retard side relative to the MBT at torque efficiencies smaller than 1.

The above is the description for the basic arrangement of the vehicle control apparatus 2. The gradient guard 10 that forms a principal part of the vehicle control apparatus 2, and the upper/lower limit guard 22 and the gradient determination section 24 related thereto will be detailed below.

The gradient guard 10 limits a gradient of the inputted desirable torque by using a predetermined guard value determined from torque adjustment capacity of the engine. The guard value is established with reference to a range of a torque gradient achievable through adjustment of the amount of intake air in the engine. More specifically, an upper limit value and a lower limit value of the torque gradient achievable through adjustment of the amount of intake air serve as the guard values of the gradient guard 10. The upper limit value of the torque gradient achievable through adjustment of the amount of intake air is the torque gradient obtained by fully opening the throttle and the lower limit value is the torque gradient obtained by fully closing the throttle.

Figure 3:
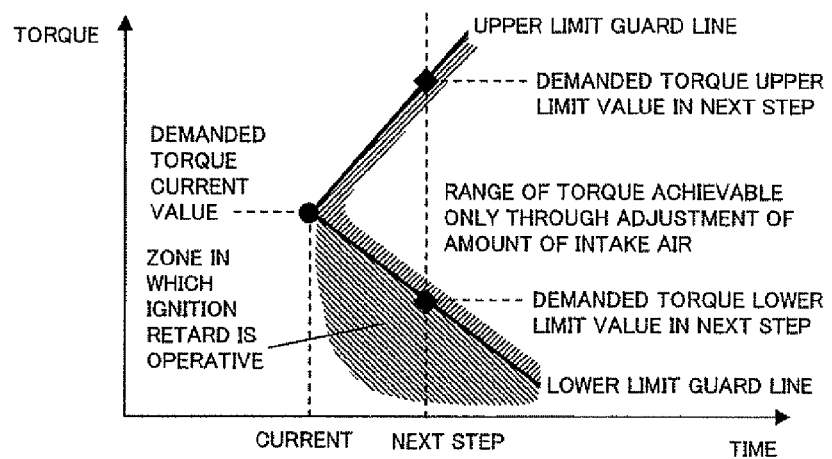
FIG. 3 is a chart for illustrating operations of a gradient guard according to the embodiment of the present invention.

FIG. 3 is a chart showing the guard values by the gradient guard 10 relative to the demanded torque outputted to the engine control unit 6. In FIG. 3, the upper limit guard line corresponds to the torque gradient achievable by fully opening the throttle and the lower limit guard line corresponds to the torque gradient achievable by fully closing the throttle. Accordingly, a zone sandwiched between the upper limit guard line and the lower limit guard line with reference to the current value of the demanded torque is the range of torque to be achievable through the adjustment of the amount of intake air. Ignition retard is operative in a range lower than the lower limit guard line.

When the desirable torque after the lapse of a predetermined period of time from the current time (in this case, in the subsequent step) falls within the range between the upper and lower limit guard lines, the value as is outputted as the demanded torque. When the desirable torque in the subsequent step exceeds the lower limit guard line, however, the gradient guard 10 limits the desirable torque by using the lower limit guard line and outputs the limited desirable torque (a demanded torque lower limit value in the figure) as the demanded torque. Alternatively, when the desirable torque in the subsequent step exceeds the upper limit guard line, the gradient guard 10 limits the desirable torque by using the upper limit guard line and outputs the limited desirable torque (a demanded torque upper limit value in the figure) as the demanded torque.

Specifically, the gradient guard 10 is adapted to limit the gradient of the demanded torque to a range that can be achieved through the adjustment of the amount of intake air at a stage of generating the demanded torque by the drive system control unit 4. Supplying the engine control unit 6 with the demanded torque having a gradient limited as described above helps prevent ignition retard for achieving the demanded torque.

Time deviations, specifically, phase shifts associated with various types of response lags such as, for example, a lag in arithmetic operations and signal transmission, a lag in a throttle operation, or a lag in a sensor output may exist between the estimated torque and the demanded torque. If the demanded torque is decreased when there is existing such a phase shift, the estimated torque transiently becomes greater than the demanded torque causing the torque efficiency to be smaller than 1 even in the range achievable through the adjustment of the amount of intake air. The upper/lower limit guard 22 and the gradient determination section 24 are the means for preventing unnecessary ignition retard in such cases.

The upper/lower limit guard 22 subjects the inputted torque efficiency to guard processing with an upper limit guard value and a lower limit guard value. The upper limit guard value is fixed to the maximum value of 1. The lower limit guard value, on the other hand, is generally set to an invalid value and, only if a flag signal of the gradient determination section 24 is ON, set to the maximum value of 1 as a valid value. Accordingly, when the lower limit guard value of the upper/lower limit guard 22 functions effectively, the torque efficiency is fixed to 1 regardless of a magnitude relation between the estimated torque and the demanded torque.

The gradient determination section 24 calculates a gradient of the demanded torque inputted from the drive system control unit 4 to the engine control unit 6, specifically, an amount of change in the demanded torque per control cycle. The gradient determination section 24 then compares a gradient of torque achievable through only the adjustment of the amount of intake air by the throttle with the gradient of the demanded torque. The torque gradient achievable through only the adjustment of the amount of intake air means the torque gradient to be achieved by fully opening or fully closing the throttle and here means the torque gradient in a decreasing direction to be achieved by fully closing the throttle.

If, as a result of the comparison, the torque gradient to be achieved through only the adjustment of the amount of intake air is greater than the gradient of the demanded torque, specifically, if the gradient of the demanded torque can be achieved through only the adjustment of the amount of intake air, the gradient determination section 24 sets the flag signal to ON. Receiving this flag signal, the upper/lower limit guard 22 sets the lower limit guard value to 1. This prevents, even if the estimated torque becomes transiently greater than the demanded torque as a result of a deviation in time between the estimated torque and the demanded torque, ignition retard from being caused thereby unnecessarily. Aggravation of fuel efficiency caused by unnecessary ignition retard can therefore be prevented.

Note that, in this embodiment, both the lower limit guard value set by the gradient guard 10 and the torque gradient used for determination made by the gradient determination section 24 are, though of the same value, set to a value of the torque gradient to be achieved by fully closing the throttle. A map created based on actually measured data or a physics model such as the air model mentioned earlier may be used for that calculation. Similarly, the value of the torque gradient to be achieved by fully opening the throttle can also be calculated by using a map or a physics model. In this embodiment, these calculations are performed by the engine control unit 6 and each guard value calculated by the engine control unit 6 is supplied to the drive system control unit 4 and set in the gradient guard 10.

The scope of the present invention is not intended to be limited to the particular embodiment described above. The present invention covers all modifications, equivalents, and alternatives falling within the spirit and scope of the invention as defined by the claims. For example, the above-described embodiment may be modified as detailed below.

Figure 4:
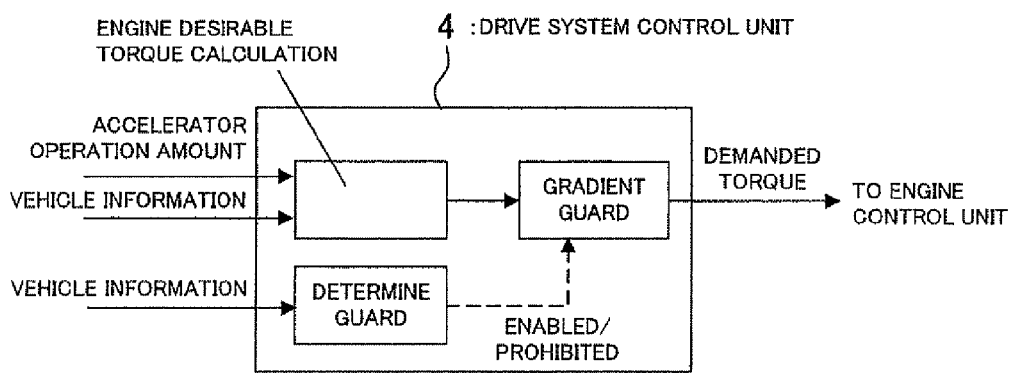
FIG. 4 is a block diagram showing a modified example of an arrangement of a drive system control unit of the vehicle control apparatus.

In one modified example, the gradient guard 10 is selectively operated according to a targeted vehicle operating state. When, for example, the targeted vehicle operating state gives precedence to fuel efficiency, the gradient guard 10 is operated in exactly the same manner as in the above-described embodiment. When, on the other hand, the targeted vehicle operating state gives precedence to torque accuracy, the gradient guard 10 is adapted not to be operative. Specifically, the desirable torque is directly supplied as the demanded torque to the engine control unit 6. The operating state giving precedence to torque accuracy includes, for example, a case in which an emergency torque is demanded, such as, stability control torque. A possible arrangement, in this case, may be such that a flag is normally set to enable operation of the gradient guard 10 and, only when the emergency torque becomes demanded, a flag is set to prohibit the operation of the gradient guard 10. Preferably, the decision to enable or prohibit the operation of the gradient guard 10 is made by the drive system control unit 4 to which various types of vehicle information are inputted, as shown in a block diagram of FIG. 4.

In another modified embodiment, the drive system control unit 4 calculates the guard values set by the gradient guard 10. A map created based on actually measured data or a physics model, such as the air model, can be used for the calculation. Engine information required for the calculation, for example, the throttle opening degree and the engine speed, may be acquired from the engine control unit 6 or directly from sensors.

In still another modified example, the guard values set by the gradient guard 10 are set outside the range of torque gradient achievable through only the adjustment of the amount of intake air. Specifically, though the lower limit guard value is set to correspond to the torque gradient achievable by fully closing the throttle in the above-described embodiment, it may be set to a value lower than that. In that case, the demanded torque can be decreased to exceed the range achievable by only the adjustment of the amount of intake air, in which case, ignition retard is activated so as to compensate for a portion that cannot be achieved though the adjustment of the amount of intake air. How much the lower limit guard value is to be lowered relative to the torque gradient to be achieved by fully closing the throttle may be determined in accordance with the amount of ignition retard permissible from the viewpoint of fuel efficiency. This achieves a reconciliation between the fuel efficiency requirement and the torque accuracy requirement of the vehicle. In addition, the guard values of the gradient guard 10 can also be changed in association with the targeted vehicle operating state.

In a further modified example, the upper/lower limit guard 22 and the gradient determination section 24 included in the engine control unit 6 are omitted. These operational elements may be omitted, if the phase shift of the estimated torque with respect to the demanded torque is ignorable.

In a still further modified example, the engine control unit 6 is arranged to include a filter. The demanded torque is passed through the filter and thereby divided into a torque component having a relatively low frequency that can be achieved through the adjustment of the amount of intake air and a torque component having a relatively high frequency that can be achieved only through the adjustment of the ignition timing. Even in such an arrangement, the amount of intake air can be adjusted based on the demanded torque and the ignition timing can be adjusted so as to compensate for any deviation between the torque achievable through the adjustment of the amount of intake air and the demanded torque. Specifically, the engine control unit 6 may be internally arranged differently from the above-described embodiment.

In a yet further modified example, the engine control unit 6 controls an engine that adjusts the amount of intake air by using an actuator other than the throttle. For example, an engine including a variable intake valve that can continuously vary a lift amount or an acting angle may be subject to the control.

The invention claimed is:

1. A control apparatus for a vehicle, the control apparatus comprising:
  a drive system control unit that comprehensively controls a drive system of the vehicle; and
  an engine control unit that controls an internal combustion engine based on demanded torque, which is torque demanded by the drive system control unit;
  wherein the engine control unit includes:
  an intake air amount adjustment unit that adjusts an amount of intake air based on the demanded torque; and
  an ignition timing adjustment unit that adjusts ignition timing so as to compensate for any deviation between torque achievable through an adjustment of the amount of intake air and the demanded torque;
  wherein the drive system control unit includes:

a desirable torque calculation unit that calculates desirable torque, which is torque to be outputted to the internal combustion engine for achieving a target operating state of the vehicle based on an accelerator operation amount by a driver or signals from various types of sensors mounted on the vehicle;

a gradient guard unit that compares a change rate of the desirable torque with an upper limit torque gradient and a lower limit torque gradient determined from torque adjustment capacity of the internal combustion engine, outputs the desirable torque after the limiting by the upper limit torque gradient as the demanded torque to the engine control unit when the change rate of the desirable torque exceeds the upper limit torque gradient, and outputs the desirable torque after the limiting by the lower limit torque gradient as the demanded torque to the engine control unit when the change rate of the desirable torque exceeds the lower limit torque gradient;

wherein the upper limit torque gradient and the lower limit torque gradient are set with reference to a range of the change rate of torque achievable through the adjustment of the amount of intake air without retarding ignition timing in the internal combustion engine.

2. The control apparatus according to claim 1, wherein the upper limit torque gradient and the lower limit torque gradient are limit values of the range of the change rate of torque achievable through the adjustment of the amount of intake air without retarding ignition timing in the internal combustion engine.

3. The control apparatus according to claim 1, wherein the engine control unit includes:
a calculation unit that calculates the upper limit torque gradient and the lower limit torque gradient based on a current or target operating state of the internal combustion engine; and
an output unit that outputs the calculated upper limit torque gradient and the calculated lower limit torque gradient to the drive system control unit.

4. The control apparatus according to claim 1, wherein the drive system control unit includes a guard determination unit that enables or prohibits limiting of the desirable torque by the gradient guard unit according to the target operating state of the vehicle.

* * * * *